United States Patent
Fu et al.

(10) Patent No.: US 12,062,760 B2
(45) Date of Patent: Aug. 13, 2024

(54) ISOCYANATE ELECTROLYTE SOLUTION ADDITIVE BASED ON IMIDAZOLE STRUCTURAL GROUP AND USE THEREOF

(71) Applicant: Valiant Co., Ltd, Yantai (CN)

(72) Inventors: Shaobang Fu, Yantai (CN); Cunsheng Lin, Yantai (CN); Yu Shi, Yantai (CN); Shanguo Zhang, Yantai (CN); Liqi Xuan, Yantai (CN); Heng Jiang, Yantai (CN)

(73) Assignee: Valiant Co., Ltd, Yantai (CN)

( * ) Notice: Subject to any disclaimer, the term of this patent is extended or adjusted under 35 U.S.C. 154(b) by 0 days.

(21) Appl. No.: 18/487,140

(22) Filed: Oct. 16, 2023

(65) Prior Publication Data

US 2024/0088443 A1 Mar. 14, 2024

Related U.S. Application Data

(63) Continuation of application No. PCT/CN2022/078801, filed on Mar. 2, 2022.

(30) Foreign Application Priority Data

Nov. 24, 2021 (CN) .......................... 202111400108.6

(51) Int. Cl.
| | |
|---|---|
| *H01M 10/0567* | (2010.01) |
| *H01M 10/0525* | (2010.01) |
| *H01M 10/0568* | (2010.01) |
| *H01M 10/0569* | (2010.01) |

(52) U.S. Cl.
CPC ... *H01M 10/0567* (2013.01); *H01M 10/0525* (2013.01); *H01M 10/0568* (2013.01); *H01M 10/0569* (2013.01)

(58) Field of Classification Search
CPC ......... H01M 10/0567; H01M 10/0525; H01M 10/0568; H01M 10/0569
See application file for complete search history.

(56) References Cited

U.S. PATENT DOCUMENTS

| | | |
|---|---|---|
| 2011/0229769 A1 | 9/2011 | Ihara et al. |
| 2012/0009486 A1 | 1/2012 | Hayakawa et al. |
| 2016/0197375 A1* | 7/2016 | Carlson ............. H01M 10/0565 429/303 |
| 2021/0265662 A1 | 8/2021 | Kim et al. |

FOREIGN PATENT DOCUMENTS

CN 114105882 A 3/2022

OTHER PUBLICATIONS

Internation Search Report of PCT/CN2022/078801, Mailed Aug. 26, 2022.

* cited by examiner

*Primary Examiner* — Stewart A Fraser
(74) *Attorney, Agent, or Firm* — True Shepherd LLC; Andrew C. Cheng

(57) ABSTRACT

The present disclosure relates to an isocyanate electrolyte solution additive based on an imidazole structural group, belonging to the technical field of non-aqueous electrolyte solution additives of lithium batteries. The structural formula of the electrolyte solution additive is represented by formula I:

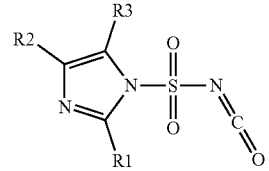

Formula I $R_1$, $R_2$ and $R_3$ are identical or different, the $R_1$, $R_2$ and $R_3$ are each independently selected from one of hydrogen, methyl, ethyl, propyl, tert-butyl, trifluoromethyl, trifluoroethyl, perfluoroethyl, perfluoropropyl, cyanoethyl, phenyl, fluorophenyl, cyano-containing fluorophenyl, alkoxy-containing phenyl and alkyl-containing phenyl. The electrolyte solution additive is used for lithium ion batteries, which effectively inhibits the reduction in battery capacity, restricts the production of a gas caused by decomposition of an electrolyte solution and significant improvement in the service life of the battery during the high temperature cycle and high temperature storage.

7 Claims, No Drawings

ISOCYANATE ELECTROLYTE SOLUTION ADDITIVE BASED ON IMIDAZOLE STRUCTURAL GROUP AND USE THEREOF

CROSS-REFERENCE TO RELATED APPLICATIONS

This application is a continuation of International Patent Application No. PCT/CN2022/078801 with a filing date of Mar. 2, 2022, designating the United States, now pending, and further claims priority to Chinese Patent Application No. 202111400108.6 with a filing date of Nov. 24, 2021. The content of the aforementioned applications, including any intervening amendments thereto, are incorporated herein by reference.

TECHNICAL FIELD

The present disclosure relates to an isocyanate electrolyte solution additive based on an imidazole structural group and application thereof, belonging to the technical field of non-aqueous electrolyte solution additives of lithium ion batteries.

BACKGROUND

Since its commercialization, a lithium secondary battery has been widely applied to the fields of digitals, energy storage, power, military aerospace and communication equipment due to its high specific energy and good cycle performance. Compared with other secondary batteries, the lithium secondary battery has the advantages of high working voltage, long cycle life, low self-discharge rate, environmental friendliness, no memory effect and the like.

In a lithium ion battery, the performance of the battery seriously declines because of the performance of the electrolyte solution to oxidize, decompose and degrade the battery along with the dissolution of metal ions in the process of cycle and high temperature storage. With the continuous increase of market demands on the lithium ion battery, higher requirements are provided to the comprehensive performance demand of the battery, and therefore use of an additive is an effective way to improve the comprehensive performance of the lithium ion battery. However, there are various kinds of additives, including a film forming additive, an overcharge protection additive, a conductive additive, a flame retardant additive, an electrolyte solution stabilizer and the like according to different functions of the additives in the electrolyte solutions. Regardless of the additive, it accounts for a small proportion of the electrolyte solution, but is widely researched and developed due to its obvious functions.

In recent years, for cathodes, including known $LiCoO_2$, $LiMn_2O_4$, $LiNiO_2$ and $LiFePO_4$, the non-aqueous solvents in the interface non-aqueous electrolyte solutions of the cathode materials and the non-aqueous electrolyte solutions of the lithium ion batteries using these cathodes can be partially oxidized and decomposed, and therefore the resulting decomposed substances and gases can hinder the original electrochemical reaction of the battery, leading to reduction in the performance of the battery such as cyclic characteristic.

Patent publication No. WO2010/021236 attempts to use compounds containing isocyanate groups in molecules to improve the long-term stability of batteries, but it is not possible to obtain sufficient durability performance through the type of isocyanate compounds, the type of additives combined therewith, or their combined quantity, and the battery performances are still not satisfied.

Patents publication No. JP2010225522, JP2006164759 and CN10153329 disclose that the isocyanate compound is added into a non-aqueous electrolyte solution, so as to improve the cycle characteristic of the battery and improve the stability of the battery. However, the materials or electrolyte solution formulations described in these patents have not yet solve the problems of high temperature stability of batteries, easy discoloration and acid value increase when used in combination with other sulfonate additives.

SUMMARY OF PRESENT INVENTION

Aiming at the defects in the prior art, the present disclosure provides an isocyanate electrolyte solution additive based on an imidazole structural group and application thereof. The electrolyte solution additive is applied to lithium ion batteries, which effectively inhibits the reduction in battery capacity, restricts the production of a gas caused by decomposition of an electrolyte solution and significant improvement in the service life of the battery during the high temperature cycle and high temperature storage.

In order to solve the above technical problem, the technical solution of the present disclosure is as follows: an isocyanate electrolyte solution additive based on an imidazole structural group is provided. The structural formula of the electrolyte solution additive is represented by formula I:

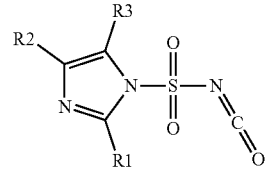

Formula I where $R_1$, $R_2$ and $R_3$ are identical or different, the $R_1$, $R_2$ and $R_3$ are each independently selected from one of hydrogen, methyl, ethyl, propyl, tert-butyl, trifluoromethyl, trifluoroethyl, perfluoroethyl, perfluoropropyl, cyanoethyl, phenyl, fluorophenyl, cyano-containing fluorophenyl, alkoxy-containing phenyl and alkyl-containing phenyl.

In one embodiment, the electrolyte solution additive is any one or a mixture of two or more selected from a group consisting of the following structural formulas:

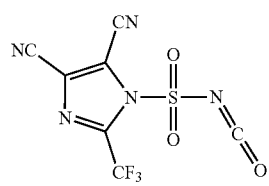

ZN-01

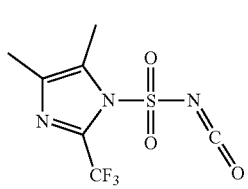

ZN-02

-continued
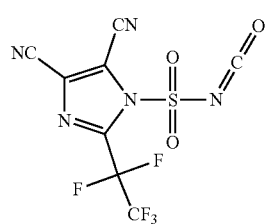
ZN-03
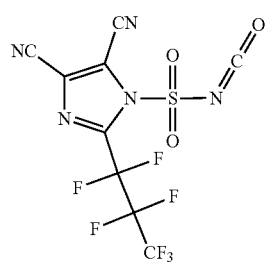
ZN-04
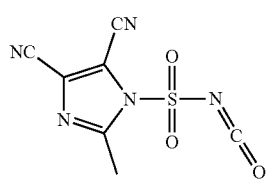
ZN-05
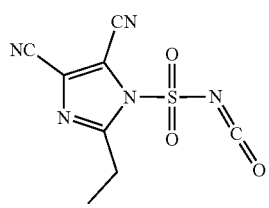
ZN-06
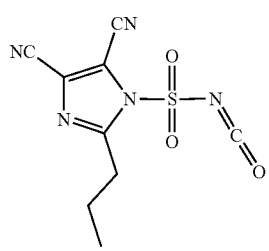
ZN-07
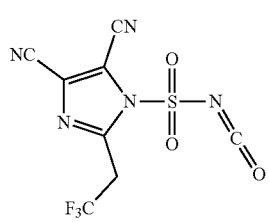
ZN-08
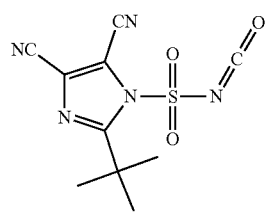
ZN-09
-continued
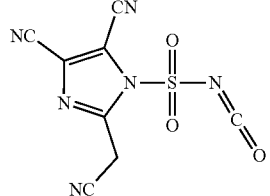
ZN-10
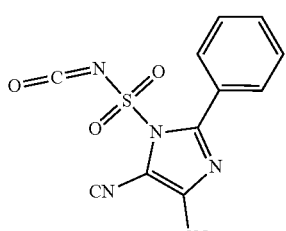
ZN-11
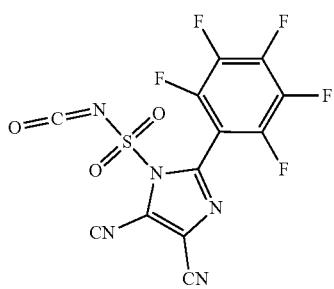
ZN-12
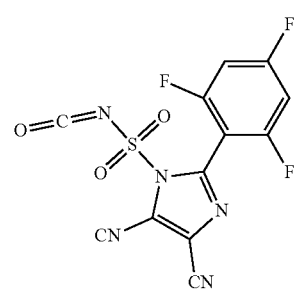
ZN-13
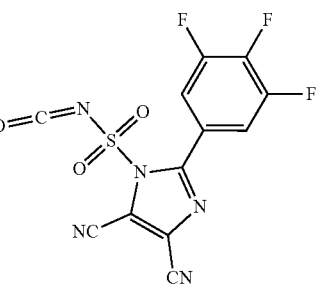
ZN-14
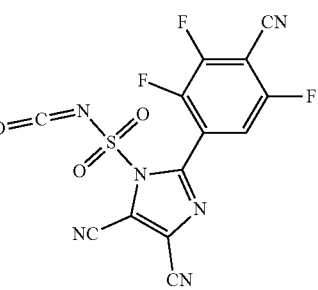
ZN-15

ZN-16
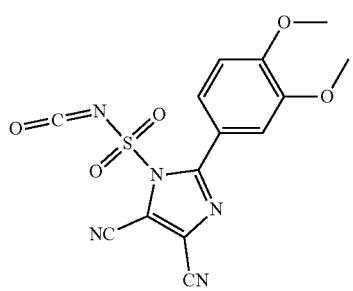

ZN-17
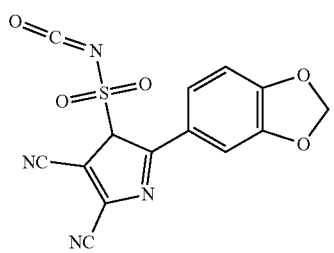

ZN-18
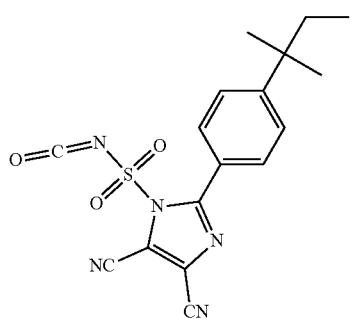

ZN-19
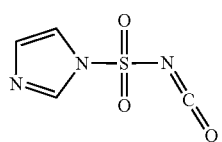

ZN-20
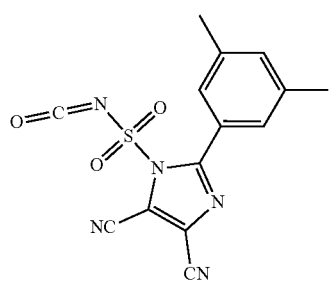

ZN-21
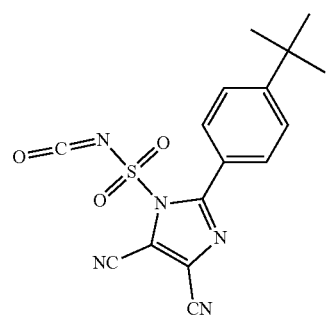

ZN-22
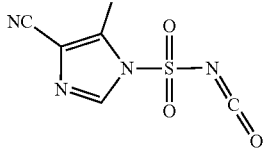

ZN-23
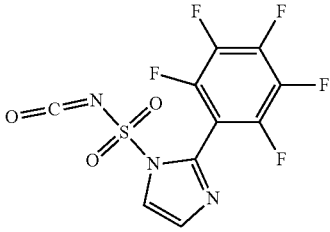

ZN-24
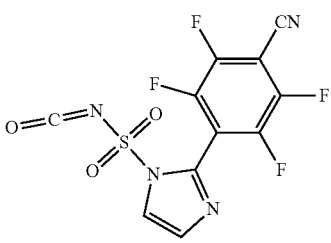

ZN-25
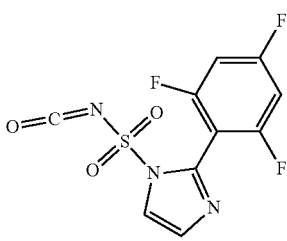

ZN-26
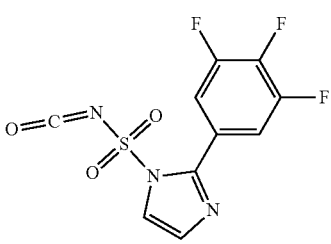

ZN-27
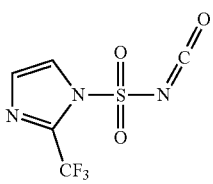

The present disclosure also discloses a method for preparing the isocyanate electrolyte solution additive based on the imidazole structural group, the method comprising the following steps:

under protection of an inert gas, evenly dispersing a first raw material and a second raw material into a first solvent to react for 1~48 hours at a controlled reaction temperature of 10° C.~120° C. to obtain an isocyanate additive solution containing the imidazole structural group;

wherein, the first solvent is any one or a mixture of two or more selected from a group consisting of ether, tetrahydrofuran (THF), cyclopentyl methyl ether, acetonitrile, ethyl acetate, or the solvent is free of participation;

a mass ratio of the first raw material to the first solvent is 1.0:(1.0~10.0);

a molar ratio of the first raw material to the second raw material is 1.0:(1.0~10.0);

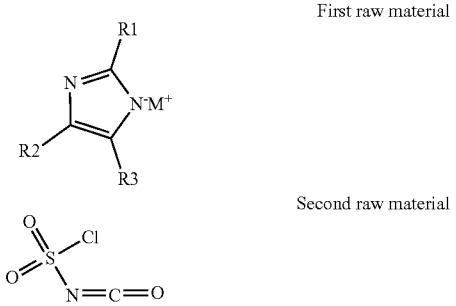

First raw material

Second raw material where $R_1$, $R_2$ and $R_3$ are identical or different, the $R_1$, $R_2$ and $R_3$ are each independently selected from one of hydrogen, methyl, ethyl, propyl, tert-butyl, trifluoromethyl, trifluoroethyl, perfluoroethyl, perfluoropropyl, cyanoethyl, phenyl, fluorophenyl, cyano-containing fluorophenyl, alkoxy-containing phenyl and alkyl-containing phenyl; and M is selected from one of Li, Na, K and Ca.

The isocyanate electrolyte solution additive based on the imidazole structural group and the preparation method thereof are cheap and easily available in raw material, mild in reaction condition, simple and safe to operate, and environmental-friendly and efficient.

The present disclosure also discloses an application of the isocyanate electrolyte solution additive based on the imidazole structural group. The isocyanate electrolyte solution additive based on the imidazole structural group is applied to a lithium ion battery, and the lithium ion battery comprises an anode, a cathode, a diaphragm disposed between the anode and the cathode and an electrolyte solution. The anode is any one or a mixture of two or more selected from a group consisting of a carbon-based active material, a silicon-based active material, a metal-based active material or a lithium-containing nitride.

The isocyanate electrolyte solution additive based on the imidazole structural group of the present disclosure can be used for preparing the non-aqueous electrolyte solution of the lithium battery and then applied to the lithium ion battery, which can effectively improve the high temperature storage property and effectively inhibits the production of the gases during the high temperature storage.

In one embodiment, the electrolyte solution comprises a second solvent, an electrolyte lithium salt and the isocyanate electrolyte solution additive based on the imidazole structural group.

In one embodiment, a mass content of the isocyanate electrolyte solution additive based on the imidazole structural group is 0.01%~5% of a total mass of the electrolyte solution, preferably 0.1%~2%.

In one embodiment, the electrolyte lithium salt is selected from one or more of $LiPF_6$, $LiClO_4$, $LiBF_4$, LiBOB, LiODFB, LiTDI, LiTFSI and LiFSI, preferably $LiPF_6$; a content of the electrolyte lithium salt is 10 wt %~20 wt % of the electrolyte solution.

In one embodiment, the second solvent is one or a combination of two or more selected from a group consisting of ester solvents and amide solvents, or a mixture of two or more of them, the ester solvent is at least one compound selected from the group consisting of cyclic carbonate compounds, linear carbonate compounds, linear ester compounds and cyclic ester compounds.

In one embodiment, the solvent is one or a combination of two or more selected from a group consisting of ethylene carbonate, propylene carbonate, butylene carbonate, ethylene fluorocarbonate, dimethyl carbonate, diethyl carbonate, dipropyl carbonate, ethylmethyl carbonate, methylpropyl carbonate, ethylpropyl carbonate, methylpropargyl carbonate, 1,4-butyrolactone, methyl propionate, methyl butyrate, ethyl acetate, ethyl propionate, propyl propionate or ethyl butyrate.

The present disclosure has the beneficial effects:

(1) the present disclosure provides an isocyanate electrolyte solution additive based on an imidazole structural group, and provides a synthesis method of such the compounds, the synthesis method is easily available in raw material, mild in reaction process conditions, simple and safe to operate, environmental-friendly and efficient;

(2) in the isocyanate electrolyte solution additive based on the imidazole structural group provided by the present disclosure, the isocyanate group has strong electrophilic activity, and can interact with water in the electrolyte solution system and active hydrogen contained in the anode and the cathode to reduce the decomposition of $LiPF_6$ caused by active hydrogen;

(3) in the isocyanate electrolyte solution additive based on the imidazole structural group provided by the present disclosure, the contained imidazole structural group contains an nitrogen atom having lone electron pairs, and the electrolyte solution is weakly alkaline and can remove HF generated by decomposition of $LiPF_6$, thereby effectively inhibiting the increase in the acidity of the electrolyte and meanwhile can inhibit the increase in chroma caused by the reaction of $PF_5$ with trace impurities in the electrolyte solution, especially in an electrolyte system containing ethylene sulfate (DTD) or methylene methane disulfonate (MMDS) that is prone to increase in the acid value and chroma of the electrolyte solution;

(4) in the isocyanate electrolyte solution additive based on the imidazole structural group provided by the present disclosure, the sulfonyl is good in film forming property, can react on the surface of the electrode after being added into the electrolyte solution to form a film and brings element S into a solid electrolyte interface (SEI) film to increase the ion conductivity, and therefore the cycle performance of the lithium ion battery can be effectively improved;

(5) in the isocyanate electrolyte solution additive based on the imidazole structural group provided by the present disclosure, the sulfonyl, nitrogen-containing heterocyclic imidazole and the isocyanate structure group are organically combined so as to be well compatible to a graphite anode; meanwhile water is removed by using the isocyanate, HF is removed by using the imidazole group, and the sulfonyl has good film forming property, so as to avoid that hydrogen fluoride generated by decomposition of $LiPF_6$ decomposes and break SEI.

DETAILED DESCRIPTION OF THE EMBODIMENTS

To make the above purpose, features and advantages of the present disclosure more obvious and understood, the specific embodiments of the present disclosure will be described in detail below. The following description sets forth many details so as to sufficiently understand the present disclosure. However, the present disclosure can be implemented in many other manners different from the description, similar improvements can be made by those skilled in the art without departing from the connotation of the present disclosure, and therefore the present disclosure is not limited by specific embodiments disclosed below.

Unless otherwise defined, all the technical and scientific terms used herein have the same meaning as that commonly understood by those skilled in the art. Herein, the terms used in the specification of the present disclosure is only for the purpose of describing the specific embodiments of the present disclosure, but is not intended to limit the present disclosure.

This example discloses preparation methods of partial compounds in compound ZN01-ZN27.

Example 1: Preparation of Compound ZN-01

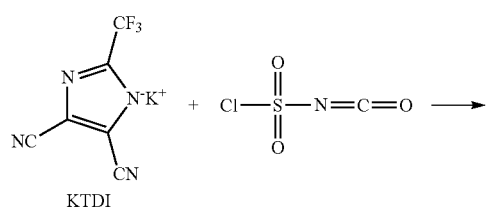

KTDI

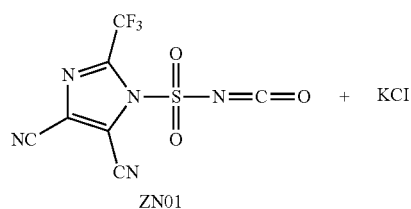

ZN01

33.6 g (0.15 mol) of KTDI, 42.4 g (0.30 mol) of sulfonyl chloride isocyanate and 150 g of anhydrous acetonitrile were added into a 500 mL three-necked flask, slowly heated to 75~80° C. and reacted for 26.0 hrs under the condition of stirring. The product obtained after the reaction was cooled and subjected to suction filtration, the filtrate was desolvated at reduced pressure until no fraction was generated to obtain a brownish yellow viscous substance, and then the resulting brownish yellow viscous substance was purified using n-heptane and dichloromethane in a chromatography column to obtain 24.0 g of white solid ZN-01, with a yield of 55.00%.

GC-MS: 291, $^{13}$C NMR (100 MHz): solvent deuterated chloroform, δ (ppm): 115.7 ppm (s, —CN), 119.8 (q, —CF$_3$), 121.6 (q, C=C), 122.4 (s, N=C=O) 147.8 (q, C—CF3).

Example 2: Preparation of Compound ZN-12

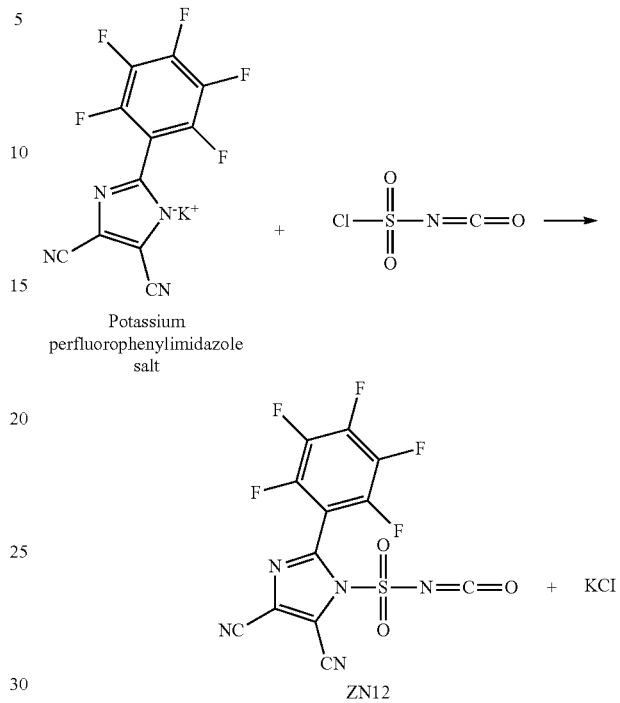

ZN12

32.2 g (0.10 mol) of potassium perfluorophenylimidazole salt, 31.1 g (0.22 mol) of sulfonyl chloride isocyanate and 150 g of anhydrous acetonitrile were added into a 500 mL three-necked flask, slowly heated to 75~80° C. and reacted for 36.0 hrs under the condition of stirring. The product obtained after the reaction was cooled and subjected to suction filtration, and the filtrate was desolvated at reduced pressure until no fraction was generated to obtain a brownish yellow viscous substance, and then the resulting brownish yellow viscous substance was purified using n-heptane and dichloromethane in a chromatography column to obtain 16.4 g of white solid ZN-12, with a yield of 42.10%.

GC-MS: 389, $^{13}$C NMR (100 MHz): solvent deuterated chloroform, δ (ppm): 113.4 (m, CC$_5$F$_5$), 116.1 ppm (s, —CN), 122.3 (q, C=C), 122.6 (s, N=C=O), 137.8 (dm), 140.4 (dm), 144.2 (dm), 146.7 (q, C—PhF5).

Example 3: Preparation of Compound ZN-19

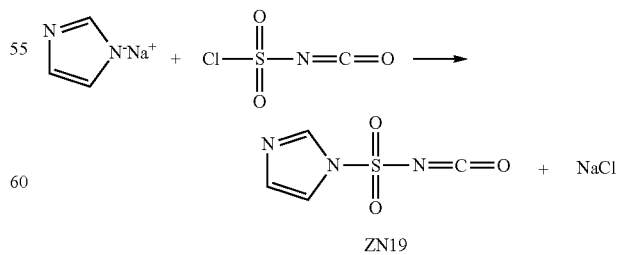

ZN19

13.6 g (0.2 mol) of imidazole, 10 g (0.25 mol, 60% content) of sodium hydride and 100 g of anhydrous cyclopentyl methyl ether were added into a 500 mL three-necked flask and stirred for 1.0 hrs, slowly added with 46.7 g (0.33 mol) of sulfonyl chloride isocyanate, heated slowly to 100~105° C. and reacted for 22.0 hrs under the condition of stirring, the product after the reaction was cooled and subjected to suction filtration, the filtrate was desolvated at reduced pressure until no fraction was generated and then further rectified at reduced pressure to obtain 16.2 g of colorless viscous oil ZN-19, with a yield of 46.82%.

GC-MS: 173, $^1$H NMR (400 MHz): solvent deuterated chloroform, δ (ppm): 7.155~7.173 ppm (d, 1H), 7.313~7.331 ppm (d, 1H), 7.912 ppm (s, 1H); $^{13}$C NMR (100 MHz): solvent deuterated chloroform, δ (ppm): 121.8 (s, N=C=O), 125.4, 134.5 (s, NCH=CHN), 136.8 ppm (s, NCHN).

Battery Example

The formulations of non-aqueous electrolyte solutions of lithium ion batteries listed in battery examples 1-9 and comparative examples 1-6 are shown in Table 1.

TABLE 1

Formulations of non-aqueous electrolyte solutions of lithium ion batteries listed in battery examples 1-9 and comparative examples 1-6

| Number | Battery cathode material | Novel imidazole isocyanate additive provided by the present disclosure | Other additives | Electrolyte lithium salt | Ethylene carbonate: dimethyl carbonate: propionate (weight percent %) |
|---|---|---|---|---|---|
| Example 1 | LiNi$_{0.8}$Co$_{0.1}$Mn$_{0.1}$O$_2$ | 0.75% ZN01 | / | 13.5% LiPF$_6$ | 30:45:25 |
| Example 2 | LiNi$_{0.8}$Co$_{0.1}$Mn$_{0.1}$O$_2$ | 1% ZN12 | / | 13.5% LiPF$_6$ | 30:45:25 |
| Example 3 | LiNi$_{0.8}$Co$_{0.1}$Mn$_{0.1}$O$_2$ | 0.5% ZN19 | / | 13.5% LiPF$_6$ | 30:45:25 |
| Example 4 | LiNi$_{0.8}$Co$_{0.1}$Mn$_{0.1}$O$_2$ | 0.5% ZN01 | 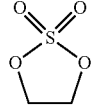 1.5% | 13.5% LiPF$_6$ | 30:45:25 |
| Example 5 | LiNi$_{0.8}$Co$_{0.1}$Mn$_{0.1}$O$_2$ | 0.75% ZN12 | 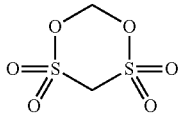 1.0% | 13.5% LiPF$_6$ | 30:45:25 |
| Example 6 | LiNi$_{0.8}$Co$_{0.1}$Mn$_{0.1}$O$_2$ | 0.3% ZN19 | 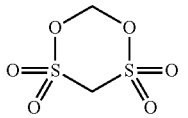 1.0% | 13.5% LiPF$_6$ | 30:45:25 |
| Example 7 | LiFePO$_4$ | 0.75% ZN01 | / | 13.5% LiPF$_6$ | 30:45:25 |
| Example 8 | LiFePO$_4$ | 1% ZN12 | / | 13.5% LiPF$_6$ | 30:45:25 |
| Example 9 | LiFePO$_4$ | 0.5% ZN19 | / | 13.5% LiPF$_6$ | 30:45:25 |
| Comparative example 1 | LiFePO$_4$ | / | / | 13.5% LiPF$_6$ | 30:45:25 |
| Comparative example 2 | LiNi$_{0.8}$Co$_{0.1}$Mn$_{0.1}$O$_2$ | / | / | 13.5% LiPF$_6$ | 30:45:25 |
| Comparative example 3 | LiNi$_{0.8}$Co$_{0.1}$Mn$_{0.1}$O$_2$ | / | 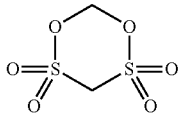 1.0% | 13.5% LiPF$_6$ | 30:45:25 |

TABLE 1-continued

Formulations of non-aqueous electrolyte solutions of lithium ion batteries listed in battery examples 1-9 and comparative examples 1-6

| Number | Battery cathode material | Novel imidazole isocyanate additive provided by the present disclosure | Other additives | Electrolyte lithium salt | Ethylene carbonate: dimethyl carbonate: propionate (weight percent %) |
|---|---|---|---|---|---|
| Comparative example 4 | LiNi$_{0.8}$Co$_{0.1}$Mn$_{0.1}$O$_2$ | / | 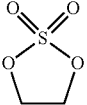 1.0% | 13.5% LiPF$_6$ | 30:45:25 |
| Comparative example 5 | LiFePO$_4$ | / | 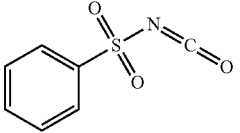 0.5% 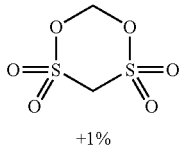 +1% | 13.5% LiPF$_6$ | 30:45:25 |
| Comparative example 6 | LiNi$_{0.8}$Co$_{0.1}$Mn$_{0.1}$O$_2$ | / | 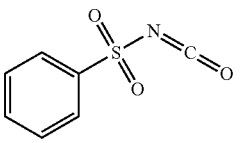 0.5% 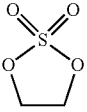 +1% | 13.5% LiPF$_6$ | 30:45:25 |

Stability test of electrolyte solution: the above lithium ion battery electrolyte solutions in examples 1-9 and comparative examples 1-6 were respectively put into sealed aluminum bottles, the aluminum bottles were vacuum encapsulated with aluminum-plastic films, and electrolyte solution samples were simultaneously stored in incubators with a set temperature of 45° C. Before storage and after storage for 60 days, the samples were taken from the glove box to detect the acidity and chroma values of the electrolyte solutions. The acidity was measured by a potentiometric titrator. The acidity value was converted into HF, unit: ppm. The chroma was measured by platinum-cobalt colorimetry, unit: Hazen. Partial test results are shown in Table 2.

TABLE 2

Influence of additives on acid value and chroma of electrolyte solution

| Number | Chroma (Hazan) | | Acid value (ppm) | |
| --- | --- | --- | --- | --- |
| | Before storage | Store for 60 days | Before storage | Store for 60 days |
| Electrolyte solution in example 1 | 10 | 40 | 8.6 | 34.3 |
| Electrolyte solution in example 2 | 10 | 50 | 7.9 | 42.8 |
| Electrolyte solution in example 3 | 10 | 45 | 8.3 | 33.4 |
| Electrolyte solution in example 4 | 10 | 35 | 7.4 | 38.6 |
| Electrolyte solution in example 5 | 10 | 60 | 9.1 | 40.2 |
| Electrolyte solution in example 6 | 10 | 40 | 10.2 | 39.2 |
| Electrolyte solution in comparative example 1 | 10 | 110 | 9.7 | 66.1 |
| Electrolyte solution in comparative example 3 | 10 | 320 | 11.1 | 198.2 |
| Electrolyte solution in comparative example 4 | 10 | 310 | 10.4 | 169.5 |
| Electrolyte solution in comparative example 5 | 10 | 90 | 8.8 | 89.2 |

It can be seen from Table 2 that the electrolyte solutions in examples 1-6 are stored for 60 days at the high temperature of 45° C., the acidity and chroma of the electrolyte solution are both lower than those in comparative examples, even though propyldisulfonic anhydride and 1,8-octyl diisocyanate were added into the electrolyte solution system in comparative example 5. The change in acidity and chroma are inhibited, but the effect is far lower than that of the material provided by the present disclosure patent.

For electrolyte solution systems containing ethylene sulfate or methylene methane disulfonate, the electrolyte additive provided by the present disclosure can more obviously inhibit the discoloration and acid value increase. Therefore, the novel additive provided by the present disclosure can effectively inhibit the increase in the acidity and chroma of the electrolyte solution and improve the stability of the electrolyte solution under high temperature conditions.

Method for Preparing Lithium Ion Type Button Batteries by Using Non-Aqueous Electrolyte Solutions of Lithium Ion Batteries in Examples 1-9 and Comparative Examples 1-6

(1) Preparation of Cathode Plate

A $LiCoO_2$ cathode material was taken as an example: cathode $LiNi_{0.8}Co_{0.1}Mn_{0.1}O_2$ powders, carbon black (particle size: 1000 nm), polyvinylidene fluoride (PVDF) and N,N-dimethyl pyrrolidone (NMP) were mixed to prepare uniform slurry, the slurry was evenly coated onto an aluminum foil (15 μm) current collector, and then dried and rolled, so as to obtain a $LiNi_{0.8}Co_{0.1}Mn_{0.1}O_2$ cathode material. After drying for 12 hours at 120° C., in the dried electrode plate, $LiNi_{0.8}Co_{0.1}Mn_{0.1}O_2$ accounted for 94% of a total coating material, a binder accounted for 4% of the total coating material, and carbon black accounted for 2% of the total coating material. Then, the obtained electrode plate was cut into a wafer with a diameter of 8 mm as a cathode. The other cathode material $LiFePO_4$ was prepared by using the same method.

(2) Preparation of Anode Plate

An artificial graphite anode material was taken as an example: artificial graphite, polyvinylidene fluoride (PVDF) and N-methylpyrrolidone (NMP) were mixed to prepare uniform slurry, and the slurry was evenly coated onto a copper foil (15 μm) current collector, and then dried and rolled to obtain a carbon anode material. After drying for 12 hours at 120° C., in the dried electrode plate, the graphite accounted for 96.4% of a total coating material, a binder accounted for 3.6% of the total coating material. Then, the obtained electrode plate was cut into wafer with a diameter of 8 mm as an anode.

(3) Preparation of Electrolyte Solution

In an argon atmosphere glove box containing <1 ppm of water, a lithium salt was dissolved into a solvent, then novel phosphine isocyanate was added, and then the above materials were evenly mixed to obtain the electrolyte solution.

(4) Preparation of Lithium Ion Battery

A CR2430 button battery was assembled by using the above materials described in steps (1) and (2) as working electrodes and a Celgard 2400 membrane (Tianjin) as a diaphragm. From the anode to the cathode, the assembling sequence was as follows: an anode shell, a spring piece, a gasket, an anode plate, an electrolyte solution, a diaphragm, a cathode plate, a cathode shell, and then a sealing machine was used for sealing. These operations were all completed in a pure argon glove box, and subsequently the above button battery was subjected to electrochemical performance test after standing for 6 h.

Performance Test of Lithium Ion Battery

Test I: High Temperature Cycle Performance Test

The prepared batteries respectively underwent the following tests:

① at 45° C., the battery was charged to 4.3 V under a constant current at a magnification of 0.1 C, and then discharged to 2.7 V under the constant current at a corresponding magnification. At this moment, this was the first cycle;

② after the first cycle was ended, the battery was charged to 4.3 V under the constant current at a magnification of 1.0 C, and then discharged to 2.7 V under the constant current at the corresponding magnification. The tests of 100 and 500 cycles were respectively performed according to such cycle conditions, and the capacity retention rates of the battery after 100 and 500 cycles were calculated respectively, wherein the capacity retention rate after the cycle is calculated according to the following formula. Relevant test data obtained from each battery is shown in Table 2, wherein the numbers of the batteries in examples 1-9 are respectively battery 1-battery 9, and the numbers of the batteries in comparative examples 1-6 are respectively battery 1#-battery 6#;

Capacity retention rate after cycle=(discharge capacity after corresponding number of cycles/discharge capacity of first cycle)×100%.

TABLE 3

Test results of cycle performance of battery at 45° C.

| Number of battery | Capacity retention rate % | |
|---|---|---|
|  | 100 cycles | 500 cycles |
| Battery 1 | 92.73 | 78.94 |
| Battery 2 | 89.27 | 76.29 |
| Battery 3 | 93.82 | 80.21 |
| Battery 4 | 91.77 | 79.88 |
| Battery 5 | 89.38 | 77.93 |
| Battery 6 | 94.32 | 81.02 |
| Battery 7 | 88.19 | 77.91 |
| Battery 8 | 87.53 | 76.02 |
| Battery 9 | 88.69 | 78.09 |
| Battery 1# | 70.12 | 50.61 |
| Battery 2# | 71.29 | 51.26 |
| Battery 3# | 80.32 | 49.32 |
| Battery 4# | 81.35 | 51.23 |
| Battery 5# | 86.21 | 69.59 |
| Battery 6# | 85.49 | 70.87 |

It can be seen from data of different batteries in Table 3 that the lithium batteries prepared by adding the additives provided by the present disclosure into different cathode material systems have cyclic stability and capacity retention rates at 45° C. far higher than those of battery 1# and battery 2# without additives.

For battery 4#-battery 5# containing ethylene sulfate or methylene methane disulfonate, the performance of the battery is degraded after high temperature cycle due to poor thermostability of such the materials.

By adding a sulfonic anhydride+isocyanate material as a stabilizing agent, data show that after 100 cycles, the capacity retention rates of battery 5# and battery 6# are improved, after 500 cycles, the capacity retention rates of battery 5# and battery 6# are far lower than those of batteries containing the additive provided by the present disclosure patent, indicating that the application of the novel additive provided by the present disclosure patent to the lithium ion battery can significantly improve the high temperature cycle performance of the battery. Even though in the ethylene sulfate or methylene methane disulfonate battery system with poor thermostability, and the electrolyte solution additive provided by the present disclosure can also exhibit good effect.

Test II: Thermo-Stability Test of Batteries Prepared in Examples 1-9 and Comparative Examples 1-6 After 100 Cycles At 25° C., the battery was charged to 4.3V under a constant current of 0.5 C, and then charged to current 0.025 C at a constant voltage of 4.3V, so that the battery was in a fully charged state of 4.3V. Then, the battery was stored for 15 days in a high-temperature furnace at 50° C. Meanwhile, the voltage drop of the battery in the high-temperature furnace and the volume change of the battery after test were tested. The test data are shown in Table 4.

Where, voltage drop change rate (%) of lithium ion battery after high temperature storage=(voltage of lithium ion battery before high temperature storage–voltage of lithium ion battery after high temperature storage)/voltage of lithium ion battery before high temperature storage×100%;

Volume change rate (%) of lithium ion battery after high temperature storage=(volume of lithium ion battery after high temperature storage–volume of lithium ion battery before high temperature storage)/voltage of lithium ion battery before high temperature storage×100%;

TABLE 4

| Number of battery | Thermostability test results | |
|---|---|---|
|  | Thermostability test | |
|  | Voltage drop change rate (%) | Volume change rate (%) |
| Battery 1 | 10.31 | 5.61 |
| Battery 2 | 12.12 | 6.63 |
| Battery 3 | 10.18 | 5.48 |
| Battery 4 | 9.18 | 5.87 |
| Battery 5 | 10.69 | 6.05 |
| Battery 6 | 9.92 | 5.73 |
| Battery 7 | 11.27 | 6.03 |
| Battery 8 | 12.42 | 6.21 |
| Battery 9 | 11.12 | 5.89 |
| Battery 1# | 31.89 | 28.53 |
| Battery 2# | 30.38 | 26.41 |
| Battery 3# | 28.26 | 15.62 |
| Battery 4# | 25.96 | 13.98 |
| Battery 5# | 18.73 | 9.69 |
| Battery 6# | 17.99 | 9.28 |

It can be seen from Table 4 that compared with states of battery 1#-battery 6# via thermostability test after 100 cycles, the battery 1-battery 9 in which the novel additive provided by the present disclosure patent is added are subjected to 100 cycles and then thermostability test at high temperature, the voltage drop change rates of the batteries are only 9.18%~12.42%, which are far lower than those of battery 1#-battery 6#.

Meanwhile, there are also significant differences in volume change rate. The volume expansion of battery 1#-battery 6# is more obvious. Even if battery 5#-battery 6# are added with sulfonic anhydride+isocyanate materials as stabilizing agents, although the volume change is improved, the effect is far lower than that of the battery containing the additive provided in the present disclosure patent. Accordingly, after the novel isocyanate electrolyte solution additive containing imidazole phosphine is applied into the lithium ion battery, the thermostability of the lithium ion battery after multiple cycles can be significantly improved, the production of the gases from the decomposition of the electrolyte solution is inhibited, and therefore the electrolyte solution additive of the present disclosure has good application prospect.

Various technical features of the above examples can be randomly combined. For making the description concise, all possible combinations of various technical features in the above examples are not described, however, combinations of these technical features should be considered as falling within the scope of the specification of the present disclosure as long as they are not in conflict.

The above examples solely express several embodiments of the present disclosure, the description is specific and detailed, but cannot be understood as limiting the scope of the present disclosure patent. It should be noted that several deformations and improvements can also be made by a person of ordinary skill in the art without departing from the concept of the present disclosure, which are all included within the protective scope of the present disclosure. Therefore, the protective scope of the present disclosure patent should be based on the appended claims.

What is claimed is:

1. An isocyanate electrolyte solution additive based on an imidazole structural group, wherein the electrolyte solution additive is any one or a mixture of two or more selected from a group consisting of the following structural formulas:

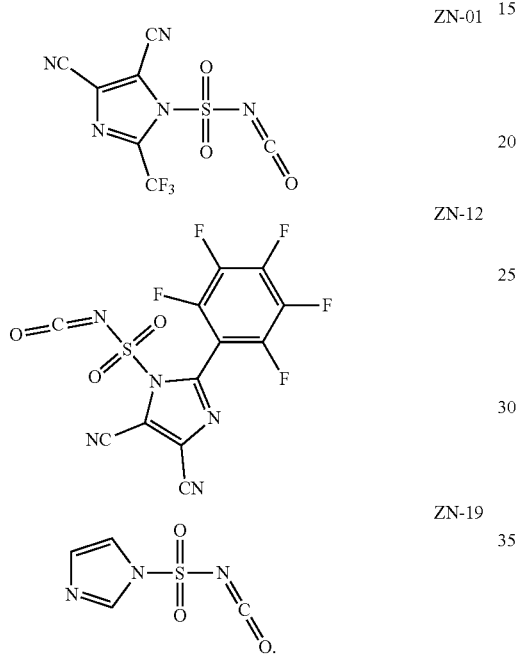

2. A method for preparing the isocyanate electrolyte solution additive according to claim 1, the method comprising the following steps:
   under protection of an inert gas, evenly dispersing a first raw material and a second raw material into a first solvent to react for 1-48 hours at a controlled reaction temperature of 10° C.-120° C. to obtain an isocyanate additive reaction solution containing an imidazole structural group;
   wherein, the first solvent is any one or a mixture of two or more selected from a group consisting of ether, tetrahydrofuran (THF), cyclopentyl methyl ether, acetonitrile and ethyl acetate;
   a mass ratio of the first raw material to the first solvent is 1.0:(1.0~10.0);
   a molar ratio of the first raw material to the second raw material is 1.0:(1.0~10.0);

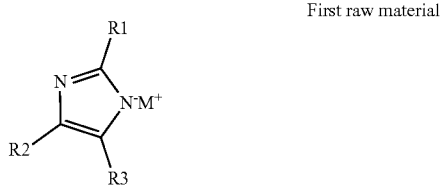

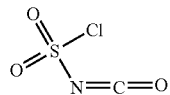

the first raw material is selected from any one of

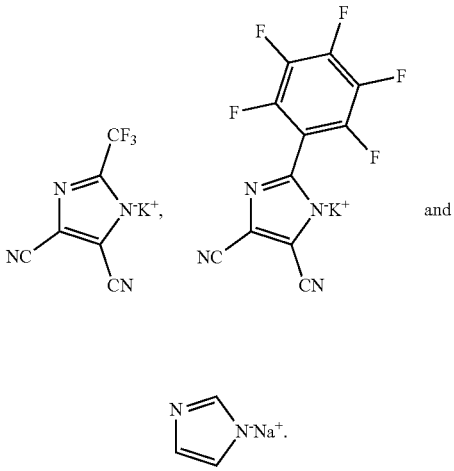

3. An application of the isocyanate electrolyte solution additive according to claim 1, wherein the isocyanate electrolyte solution additive is applied to a lithium ion battery, and the lithium ion battery comprises an anode, a cathode, a diaphragm disposed between the anode and the cathode, and an electrolyte solution.

4. The application of the isocyanate electrolyte solution additive according to claim 3, wherein the electrolyte solution comprises a solvent, an electrolyte lithium salt and the isocyanate electrolyte solution additive based on the imidazole structural group.

5. The application of the isocyanate electrolyte solution additive according to claim 4, wherein a mass content of the isocyanate electrolyte solution additive based on the imidazole structural group is 0.01%~5% of a total mass of the electrolyte solution.

6. The application of the isocyanate electrolyte solution additive according to claim 4, wherein the electrolyte lithium salt is selected from one or more of $LiPF_6$, $LiClO_4$, $LiBF_4$, LiBOB, LiODFB, LiTDI, LiTFSI and LiFSI; a content of the electrolyte lithium salt is 10 wt %-20 wt % of the electrolyte solution.

7. The application of the isocyanate electrolyte solution additive according to claim 4, wherein the solvent is one or a combination of two or more selected from a group consisting of ethylene carbonate, propylene carbonate, butylene carbonate, ethylene fluorocarbonate, dimethyl carbonate, diethyl carbonate, dipropyl carbonate, ethylmethyl carbonate, methylpropyl carbonate, ethylpropyl carbonate, methylpropargyl carbonate, 1,4-butyrolactone, methyl propionate, methyl butyrate, ethyl acetate, ethyl propionate, propyl propionate or ethyl butyrate.

* * * * *